United States Patent [19]

Ishiguro et al.

[11] 4,400,433
[45] Aug. 23, 1983

[54] PROCESS FOR THE PREPARATION OF MOLDING FLEXIBLE GRAPHITE GRANULES AND A MOLDED GRAPHITE PRODUCT PRODUCED THEREFROM

[75] Inventors: Jiro Ishiguro, Suita; Kazuo Maruya, Fukui, both of Japan

[73] Assignee: Fukuvi Chemical Industry Co., Ltd., Fukui, Japan

[21] Appl. No.: 260,172

[22] Filed: May 4, 1981

[30] Foreign Application Priority Data

May 2, 1980 [JP] Japan ................................. 55-57781
Sep. 8, 1980 [JP] Japan ................................ 55-123507

[51] Int. Cl.³ .............................................. C01B 31/04
[52] U.S. Cl. .................................... 428/408; 423/448; 138/137; 23/314
[58] Field of Search ................ 423/448; 264/330, 105, 264/113; 428/408, 310; 23/314; 138/137

[56] References Cited

U.S. PATENT DOCUMENTS

| | | | |
|---|---|---|---|
| 3,409,563 | 11/1968 | Olstowski | 423/448 |
| 4,075,114 | 2/1978 | Ishikawa et al. | 423/448 |
| 4,190,257 | 2/1980 | Schnitzler | 277/102 |
| 4,244,934 | 1/1981 | Kondo | 423/448 |

FOREIGN PATENT DOCUMENTS

| | | | |
|---|---|---|---|
| 797144 | 10/1968 | Canada | 423/448 |
| 855127 | 11/1970 | Canada | 423/448 |
| 53-37078 | 10/1978 | Japan . | |

*Primary Examiner*—Hiram H. Bernstein
*Attorney, Agent, or Firm*—Armstrong, Nikaido, Marmelstein & Kubovcik

[57] ABSTRACT

Flexible graphite granules prepared by a process comprising agitating vermiform expanded graphite masses having a bulk density of not more than 0.01 g/cc in a liquid have been found to be extremely suitable for producing a flexible graphite product, even with a low density, having an excellent shape-retaining property as well as a shapeability and exhibiting strong mechanical strengths.

6 Claims, No Drawings

PROCESS FOR THE PREPARATION OF MOLDING FLEXIBLE GRAPHITE GRANULES AND A MOLDED GRAPHITE PRODUCT PRODUCED THEREFROM

This invention relates to a process for the preparation of molding flexible graphite granules and a molded graphite product produced therefrom. More particularly, the present invention is concerned with a process for the preparation of novel molding flexible graphite granules which can be easily and advantageously molded into a shaped graphite product having excellent properties. The present invention is also concerned with such a molded graphite product having excellent properties.

Heretofore, various processes have been proposed for producing flexible graphite products. The known processes generally consist in treating graphite particles with an acid to form graphite intercalation compounds, rapidly heating the graphite intercalation compounds at a high temperature to obtain vermiform expanded graphite masses which are expanded in the c axis direction (the direction perpendicular to the layers of graphite), and compressing the expanded graphite masses in the presence or absence of a binder to produce a sheet- or block-shaped graphite product.

However, the vermiform expanded graphite masses as mentioned above are as light in weight as less than 0.01 g/cc in bulk density and tend to be easily compressed into a massive shape even under a small pressure. Therefore, not only is it difficult to charge the vermiform expanded graphite masses as a molding material into a metal mold uniformly, but also the molded product itself tends to be non-uniform. In addition, when a product having a relatively large thickness is desired, it is necessary to use a metal mold with a considerably large depth, disadvantageously leading to not only restriction with respect to working but also high cost in making a metal mold.

In order to eliminate the drawbacks accompanying the vermiform expanded graphite masses as a molding graphite, there has been proposed a method for producing a packing ring (see U.S. Pat. No. 4,190,257). In the proposed method, graphite flakes are expanded by a factor of at least 80 times in the c axis direction, the expanded graphite flakes are compressed to form a flexible graphite sheet having a density of about 10 to about 100 lbs/ft$^3$ (0.16 to 1.6 g/cc) and a thickness of about 0.0003 to about 0.060 inch (0.075 to 0.15 mm), the flexible graphite sheet is shredded to obtain flexible graphite particles, and the flexible graphite particles are then compressed together to produce a packing ring having a density of 70 to 120 lbs/ft$^3$ (1.12 to 1.92 g/cc) (hereinafter often referred to as "molded article by a sheet shredding process"). In order to obtain a shape-retaining property, such a molded article by a sheet shredding process should have a density of at least 1.12. When such a high density molded article is used as a packing ring, it is poor in reformability, leading to not only an insufficient sealing property but also an insufficient mechanical strength.

With a view to developing a novel molding graphite material which is easy to handle and which, when molded into a shaped article, gives an excellent molded product having not only a sufficient shape-retaining property even with a relatively low density but also an excellent reformability so that the molded article has a high sealing property as well as a high mechanical strength, the present inventors have made extensive and intensive researches. As a result, it has been found that when vermiform expanded graphite masses are immersed in a liquid which is inert to the graphite, so that the liquid is present between the expanded graphite layers and on the surfaces of the graphite masses to prevent mutual cohesion between the graphite masses, and capable of wetting at least the surfaces of the graphite masses and then agitated, the vermiform expanded graphite masses undergo compression and density-increase to form flexible graphite granules which are easy to handle and can be easily and advantageously molded into a shaped article. The present invention has been made, based on such a novel finding.

Accordingly, it is an object of the present invention to provide a process for the preparation of molding flexible graphite granules which have an increased bulk density and are excellent in fluidity, and which process can be easily, simply carried out.

It is another object of the present invention to provide a process for the preparation of molding flexible graphite granules having a further increased bulk density which granules are effective for increasing the productivity of molded articles and for reducing the length of a metal mold to be used for the molding operation.

It is a further object of the present invention to provide a molded graphite product which is produced from the above-mentioned molding flexible graphite granules and has not only a sufficient shapeability and a shape-retaining property even at a relatively low density, but also a high mechanical strength.

The foregoing and other objects, features and advantages of the present invention will be apparent to those skilled in the art from the following detailed description and appended claims.

According to one aspect of the present invention, there is provided a process for the preparation of molding flexible graphite granules which comprises immersing vermiform expanded graphite masses having a bulk density of not more than 0.01 g/cc in a liquid which is inert to the graphite and capable of wetting at least the surfaces of the graphite masses, agitating the graphite masses in the liquid for a time sufficient for the graphite masses to undergo compression and density-increase and form graphite granules, separating the graphite granules from the liquid, and drying the graphite granules.

When the vermiform expanded graphite masses are agitated in the liquid, the graphite masses are mixed and agitated in a state where the liquid is present between the expanded graphite layers and on the surfaces of the graphite masses and, therefore, the graphite masses are subjected to compression and increase in density to form graphite granules. The graphite granules thus formed are separated from the liquid and then dried to give flexible graphite granules having a bulk density of not less than 0.03 g/cc, generally, about 0.003 to about 0.5 g/cc. Such flexible graphite granules have high fluidity and chargeability and are very suitable for producing a molded article having a uniform quality. The flexible graphite granules can be molded by means of an extrusion molding machine and can also be molded into a sheet by simple compression. The size of the flexible graphite granules obtained by the process of the present invention varies depending on the kind of raw material and immersion-agitation conditions, but may generally be in the range of 300 to 100 mesh (Tyler). When the flexible graphite granules are molded by means of an extrusion molding machine, those having a size of 30 to 60 meshes are preferably employed. On the other hand, when the production of a sheet by compression is intended, the use of flexible graphite granules having a size of not less than 35 meshes is preferable. If the size is less than 35 meshes, the co-use of a binding agent is needed.

Vermiform expanded graphite masses to be employed in the process of the present invention may be those obtained by treating particles of natural graphite, Kish graphite or a synthetic graphite such as pyrolytic graphite with a strongly oxidative acid solution, such as fuming sulfuric acid, fuming nitric acid, a mixed acid of concentrated sulfuric acid and concentrated nitric acid, a mixture of concentrated sulfuric acid and potassium chlorate, chromic acid, dichromic acid, potassium dichromate or ammonium persulfate or a mixture of concentrated sulfuric acid and phosphoric acid or potassium permanganate; washing the treated graphite particles with water; drying the washed graphite particles; and rapidly heating the resulting graphite particles at a temperature of 600° C. or more, preferably 800° C. or more to effect expansion of the graphite particles. Instead of the treatment with an acid, an electrolytic oxidation may be employed. In the above-mentioned process, if, after the treatment with an acid and washing with water, the washed graphite particles is contacted with an antioxidant comprising at least one metal salt of a boric acid ester of a member selected from the group consisting of a reduction product of a monosaccharide, a dimer of a monosaccharide and combinations thereof for a sufficient time for said antioxidant to permeate said washed graphite particles, said metal being a member selected from metals of the group II of the periodic table and the resulting graphite particles are expanded by heat treatment to obtain vermiform graphite masses, the flexible graphite granules obtained from such vermiform expanded graphite masses as well as molded graphite products are imparted with excellent oxidation-resistance. As examples of the reduction product of a monosaccharide, there can be mentioned sorbitol and mannitol which are reduction products of dextrose and D-fructose, respectively. The dimers of monosaccharides are those which are generally called "disaccharides", and include, for example, sucrose, maltose and lactose. Among metals of the group II of the periodic table, there may advantageously be employed magnesium, calcium, zinc, barium and the like (with respect to the above-mentioned antioxidant, reference may be made to U.S. Pat. No. 4,244,934).

As examples of the liquid which is inert to graphite and capable of wetting at least the surfaces of the vermiform expanded graphite masses, there can be mentioned water, a water-soluble alcohol such as methyl alcohol, ethyl alcohol or isopropyl alcohol, an aqueous solution of such an alcohol, a water-soluble diol such as ethylene glycol, propylene glycol or butylene glycol, and carbon tetrachloride. Especially, water is most preferred from a viewpoint of ease in handling as well as economics. The amount of the liquid may be at least 25 times, preferably 30 to 50 times that of the vermiform expanded graphite masses by weight. By the use of the above-mentioned amount of the liquid, the liquid layers sufficient for preventing mutual cohesion between the expanded graphite masses and between the expanded graphite layers are formed on the surfaces of the expanded graphite masses, so that compression, increase in density and granulation of the vermiform expanded graphite masses are attained by ordinary agitation. For example, when the vermiform expanded graphite masses containing water in an amount sufficient for forming water layers on the surfaces of the graphite masses are agitated in an agitation type mixer with agitating blades capable of causing turbulent flow or in a rotary mixer such as a V-mixer, the vermiform expanded graphite masses are not bonded together into a massive shape but compressed and increased in bulk density to form flexible graphite granules. This is believed to be such that the liquid layers serve to prevent cohesion between the expanded graphite layers and between the graphite masses. In the course of the above-mentioned agitation, the liquid which is contained in the graphite masses is released as the graphite masses are compressed and increased in bulk density, thereby forming a slurry of graphite granules. The slurry is subjected to centrifugation or filter pressing to remove the liquid and then dried, whereby molding flexible graphite granules are obtained. The use of a centrifugal separator or a filter press is effective for increasing the bulk density of the graphite granules in the slurry and, hence, preferred especially when the preparation of molding flexible graphite granules having a relatively high bulk density is intended.

A further detailed explanation will be given with respect to the case where water is employed as the liquid. Vermiform expanded graphite masses having a bulk density of 0.005 g/cc are immersed in water to completely wet-out the graphite masses with water. The completely wetted graphite masses are put on, for example, a metallic net to remove excess water and charged into a V-mixer, followed by rotary mixing for 5 minutes or more, preferably about 30 minutes. The temperature is not critical, and generally, room temperature is preferably used. Due to mutual collision of the graphite masses, friction between the graphite masses and the wall of the mixer and the like, the wetted graphite masses are compressed and granulated while releasing the water, thereby forming a slurry. The slurry is dehydrated by means of a centrifugal separator to obtain water-containing flexible graphite granules which are then dried at about 150° to 160° C. The flexible graphite granules have an excellent fluidity and are free-flowing, and they are not easily compressed into a massive shape under a small pressure as different from the untreated vermiform graphite masses. The bulk density of the flexible graphite granules is not less than 0.03 g/cc, generally 0.03 to 0.05 g/cc, that is, increased by a factor of 6 times or more that of the untreated vermiform graphite masses. The flexible graphite granules thus obtained can be easily molded by pressing into various shapes of articles such as a ring, pipe, rod, etc. The flexible graphite granules alone may be molded, but, if desired, upon incorporation of a phenolic resin and other additives into the graphite granules, molding may be effected.

The flexible graphite granules may be supplied into a screw extruder having a predetermined compression ratio and extruded therethrough to obtain flexible graphite granules having a further increased bulk density. In general, by the use of a screw extruder having a compression ratio 2 to 3, the bulk density of the once formed graphite granules can be further increased to more than about 0.05 g/cc, usually up to about 0.1 g/cc. The flexible graphite granules having such a further increased bulk density are effective for increasing the productivity of molded articles and for reducing the length of a metal mold to be used for the molding operation.

According to another aspect of the present invention, there is provided a molded graphite product produced by a process comprising immersing vermiform expanded graphite masses having a bulk density of not more than 0.01 g/cc in a liquid which is inert to the graphite and capable of wetting at least the surfaces of the graphite masses, agitating the graphite masses in the liquid for a time sufficient for the graphite masses to undergo compression and density-increase and form graphite granules, separating the graphite granules from the liquid, and drying the graphite granules, followed by molding by pressing to have a density of 0.8 to 2.0 g/cc.

In this aspect of the present invention also, the further increase of bulk density of the once formed graphite granules may be effected by means of a screw extruder as mentioned before, and is very effective for increasing the productivity of molded articles and for reducing the length of a metal mold to be used for the molding operation.

The molded graphite product according to the present invention has preferably a density of about 0.8 to 2.0 g/cc. However, even if the density of the molded product is less than 0.8 g/cc, for example, to a level of about 0.5 g/cc, the molded graphite product is applicable to special uses, although in the production there are some difficulties in handling.

For the generally practical molded graphite product, those having a density of about 0.8 to 2.0 g/cc are preferred. As examples of the molded graphite product, there can be mentioned a packing ring, pipe, round rod, angular rod and a relatively long article having a semicircular or U-shape in cross-section and a relatively small section thickness. The molded graphite product according to the present invention, even with a density as low as 0.8 to 1.1 g/cc, is excellent in shapeability as well as shape-retaining property. Especially when the present molded graphite product is used as a packing ring, it is excellent in sealing property because of its high reformability. In this respect, the present molded graphite product is extremely excellent over the "molded article (packing ring) by a sheet shredding process." Further, the present molded graphite product is excellent in mechanical strength as compared with the conventional molded graphite products. For example, as one of the mechanical strengths, with respect to a pipe or an annular product, there is a diametral ring compression strength (DRCS) as defined as follows.

$$DRCS\ (kg/mm^2) = \frac{P(D - d)}{l \times d^2}$$

wherein l represents a length (mm), d represents a radial thickness (mm), D represents an outer diameter and P represents a load (kg) at the time when the test sample is broken.

With respect to a diametral ring compression strength (DRCS), the molded annular graphite products of the present invention were compared with the molded annular graphite products obtained by a sheet shredding process. With respect to the molded annular graphite products of the present invention, 500 g of vermiform expanded graphite masses having a bulk density of 0.004 g/cc are combined with water in an amount of 50 times (by weight) that of the graphite masses and agitated in a state of turbulent flow for 30 minutes. There was obtained a slurry containing 2 wt % of grannular solids. The slurry was dehydrated by means of a centrifugal separator to obtain solids, which were then dried to obtain 490 g of flexible graphite grannules having a bulk density of 0.035 g/cc.

The graphite grannules thus obtained were supplied into a screw extruder having a given compression ratio and then charged, while compressing, into a metal mold attached to a forward end of the screw extruder through the screw extruder. The metal mold was detached from the screw extruder and the graphite granules charged in the metal mold was molded by pressing. In this instance, the amount of graphite granules to be charged and the pressure to be applied at the time of molding were varied to obtain molded annular articles having an outer diameter of 16 mm, an inner diameter of 10 mm and a length of 5 mm but having varied densities. Measurements of DRCS were done with respect to them. On the other hand, with respect to the molded annular graphite products obtained by a sheet shredding process, a graphite sheet having a density of 1.0 g/cc and a thickness of 0.34 mm was shredded by means of a shredder to obtain a graphite material having particle characteristics as shown in Table 1. Using the graphite material, there were produced molded annular articles having the same shape but having varied densities, and measurements of DRCS were done.

TABLE 1

| particle size (mesh, Tyler) | weight (g) | bulk density (g/cc) | distribution (%) |
|---|---|---|---|
| +16 | 0.96 | — | 1.9 |
| 16–32 | 21.6 | 0.174 | 43.3 |
| 32–48 | 14.9 | 0.16 | 29.9 |
| 48–60 | 3.6 | 0.14 | 7.2 |
| 60–100 | 5.6 | 0.18 | 11.2 |
| −100 | 3.3 | 0.30 | 6.6 |
| Total | 49.9 | whole bulk density 0.19 | 100% |

Measurements of DRCS were done using Shimadzu Autograph IS-2000 (trade name of a product manufactured and sold by Shimadzu Seisaku-sho, Japan). Results are shown in Table 2.

TABLE 2

| | density (g/cc) | 0.5 | 0.6 | 0.7 | 0.8 | 1.0 | 1.2 | 1.5 | 1.7 |
|---|---|---|---|---|---|---|---|---|---|
| DRCS (kg/mm²) | present molded article | 0.14 | 0.37 | 0.59 | 0.78 | 1.16 | 1.68 | 2.30 | 2.72 |
| | molded article by a sheet shredding process | — | — | — | — | — | 0.20 | 0.76 | 1.75 |

With respect to the molded annular articles obtained by a sheet shredding process, those having a density of 1.0 or less could form a shape of a molded article somehow, but the mechanical strength was extremely low so that it was impossible to measure DRCS. In contrast, the molded annular articles according to the present invention exhibit extremely high DRCS as compared with the molded annular articles obtained by a sheet shredding process and having the same densities as those of the present molded annular articles.

As is apparent from the foregoing, the molded graphite products according to the present invention, even with a low density, have an excellent shape-retaining property as well as an excellent shapeability and exhibit high mechanical strengths.

The present invention is further illustrated in more detail by the following examples, which should not be construed to be limiting the scope of the present invention.

In Examples and Comparative Examples, measurements of DRCS were done by means of Shimadzu Autograph IS-2000 as mentioned before.

EXAMPLE 1

500 g of vermiform expanded graphite masses having a bulk density of 0.004 g/cc were immersed in water to completely wet-out the graphite masses with water. The completely wetted graphite masses were put on a metallic net for 5 minutes to remove excess water and charged into a V-mixer, followed by rotary mixing for 30 minutes. By the mixing and agitation, the wetted graphite masses were compressed and granulated while releasing the water, thereby forming a slurry containing 2 to 3 wt % of solids. The slurry was dehydrated by means of a centrifugal separator to obtain water-containing flexible graphite granules, which were then dried at a temperature higher than 100° C. There were obtained 480 g of flexible graphite granules having excellent fluidity and a bulk density of 0.03 g/cc. The flexible graphite grannules thus obtained were free-flowing and, therefore, were easy to supply into a screw extruder through a hopper.

EXAMPLE 2

The same slurry containing 3 wt % of graphite grannules as obtained in Example 1 was subjected to pressing under 10 kg/cm² by means of a filter press for 10 minutes to remove water. When the resulting cake was completely dried at 130° C., the cake was easily disintegrated to obtain 485 g of flexible graphite granules having a bulk density of 0.07.

EXAMPLE 3

500 g of vermiform expanded graphite masses having a bulk density of 0.004 g/cc were combined with water in an amount of 50 times (by weight) that of the graphite masses, and agitated in a state of turbulent flow for 30 minutes. The graphite masses were compressed to give a slurry containing 2 wt % of granular solids. The slurry was dehydrated by means of a centrifugal separator to obtain solids, which were then dried to obtain 490 g of flexible graphite granules having a bulk density of 0.035 g/cc.

EXAMPLE 4

The flexible graphite granules as obtained in Example 3 were fed to a screw extruder with a screw having a compression ratio of 2, and transferred therethrough while leaving the forward end of the extruder opened. The resulting flexible graphite granules were caused to have a bulk density of 0.05 g/cc.

EXAMPLE 5

1.82 g of the flexible graphite granules were fed to a screw extruder with a screw having a compression ratio of 2 and charged while being compressed, through the screw extruder, into a metal mold attached to the forward end of the screw extruder. The metal mold was for molding a pipe and had, as the corresponding dimensions, an outer diameter of 14.7 mm, an inner diameter of 10 mm and a length of 70 mm. After charging, the metal mold was detached from the screw extruder, and the graphite granules compressed and charged in the metal mold were molded by pressing under a pressure of 90 kg/cm² to obtain a 20 mm-long pipe having a density of 1.0.

EXAMPLE 6

2.73 g of the flexible graphite granules as obtained in Example 2 were charged into a metal mold for molding a pipe. The metal mold has, as the corresponding dimensions, an outer diameter of 14.7 mm, an inner diameter of 10 mm and a length of 70 mm. The graphite granules charged in the metal mold were molded by pressing under a pressure of 270 kg/cm² to obtain a 20 mm-long pipe having a bulk density of 1.5. The value of DRCS was measured to give 2.30 kg/mm².

COMPARATIVE EXAMPLE 1

2.73 g of graphite particles obtained by shredding a graphite sheet having a density of 1.0 g/cc and a thickness of 0.34 mm (see Table 1) were molded by pressing in the same manner as described in Example 5. There was obtained a 20 mm-long pipe having a density of 1.5. The value of DRCS was measured to give 0.76 kg/mm².

EXAMPLE 7

3.28 g of the graphite granules as obtained in Example 2 were molded by pressing under a pressure of 840 kg/cm² in the same manner as described in Example 5. There was obtained a 20 mm-long pipe having a density of 1.8.

EXAMPLE 8

45.5 g of the graphite granules as obtained in Example 3 were fed to a screw extruder with a screw having a compression ratio of 3.0, and charged while being compressed, through the screw extruder, into a metal mold attached to the forward end of the screw extruder. The metal mold was designed for molding a pipe and had, as the corresponding dimentions, an outer diameter of 75 mm, an inner diameter of 65 mm and a length of 210 mm. The metal mold was detached from the screw extruder, and the graphite granules were molded by pressing under a pressure of 270 kg/cm² to obtain a 28 mm-long pipe having a density of 1.5.

EXAMPLE 9

7.2 g of the graphite granules as obtained in Example 3 were charged into a metal mold having an outer diameter of 75 mm, an inner diameter of 65 mm and a length of 210 mm. The graphite granules charged in the metal mold were molded by pressing under a pressure of 270 kg/cm² to obtain a 4.4 mm-long packing ring having a density of 1.5.

EXAMPLE 10

14.2 g of the graphite granules as obtained in Example 2 were fed to a screw extruder with a screw having a compression ratio of 3.0, and charged while being compressed, through the screw extruder, into a metal mold attached to the forward end of the screw extruder. The metal mold was for molding a round rod and had, as the corresponding dimensions, a diameter of 20 mm and a length of 100 mm. The metal mold was detached from the screw extruder. The graphite granules charged in the metal mold were molded by pressing under a pressure of 270 kg/cm$^2$ to obtain a 30 mm-long round rod having a density of 1.5. It was possible to subject the round rod to cutting.

EXAMPLE 11

To 260 g (1 mole in terms of sorbitol) of SORBIT D-70 (trade name of a 70 weight % aqueous solution of sorbitol manufactured and sold by Towa Kasei Kogyo Kabushiki Kaisha, Japan) were added 61.8 g (1 mole) of boric acid. The resulting mixture was heated, while stirring, at 110° to 120° C. for 3 hours to effect esterification with dehydration. The thus obtained boric acid ester of sorbitol was diluted with water so as to form an aqueous solution of the boric acid ester which solution had a solid content of 50% by weight. To the aqueous solution were portion-wise added, with agitation, 20.2 g (0.5 mole) of magnesium oxide to effect neutralization reaction. There was obtained the desired magnesium salt of boric acid ester of sorbitol. The thus obtained salt of the boric acid ester was a transparent, viscous liquid and easily soluble in water. The pH value of a 1 weight % aqueous solution of the salt was 7.2.

100 g of North Korea-produced natural flake graphite particles having a bulk density of 0.64 and a sieve size of 42 to 80 mesh (Tyler) were dispersed in 400 g of 80% nitric acid, and then, 8 g of potassium permanganate were portionwise added, while stirring, at 30° C. As the potassium permanganate was added as mentioned above, the temperature of the system rose by about 10° C. After the addition of magnesium permanganate, the system was heated, and maintained at 60° C. for 3 hours to accomplish oxidation reaction. The liquid in the system was removed by centrifugation, and subsequently the resulting graphite particles were washed with water so that the pH value thereof became 6.0. The thus washed graphite particles were dehydrated by centrifugation so that the water content thereof became about 30%, to obtain wet graphite particles.

100 g of the wet graphite particles were dipped in 500 ml of an aqueous solution (concentration: 3% by weight) of magnesium salt of the boric acid ester of sorbitol for 1 hour. The resulting soggy graphite particles were subjected to suction filtration so that the content of the aqueous solution was adjusted to 30% by weight.

The graphite particles treated as mentioned above were dried at temperatures below 100° C. and then heated in an electric furnace at 1,000° C. for 1 minute to obtain vermiform expanded graphite masses having a bulk density of 0.009. The vermiform graphite masses were treated in the same manner as in Example, to obtain flexible graphite granules having a bulk density of 0.08 g/cc.

The graphite granules thus obtained were molded by means of a pressing machine or a pressing roll to obtain a 0.3 mm-thick sheet having a density of 0.85.

A predetermined number of the graphite sheets were laminated and gradually deformed in a U-shaped metal mold by pressing using a die, followed by a final pressure-molding under a pressure of 400 kg/cm$^2$ to obtain a U-shaped article. This product is excellent in sliding property and oxidation resistance and, therefore, is useful as a heat resistant shoot.

What is claimed is:

1. A molded graphite product produced by a process comprising:
    immersing veriform expanded graphite masses having a bulk density of not more than 0.01 g/cc in a liquid which is inert to the graphite and capable of wetting at least the surfaces of the graphite masses, said liquid being employed in an amount of at least 25 times, by weight, that of the vermiform expanded graphite masses;
    agitating the graphite masses in the liquid for a time sufficient for the graphite masses to undergo compression and density-increase and form graphite granules;
    separating the graphite granules from the liquid;
    drying the graphite granules; and
    molding the dried graphite granules by pressing to have a density of 0.8 to 2.0 g/cc.

2. A molded graphite product according to claim 1, wherein the process further comprises feeding the dried graphite granules to a screw extruder with a screw having a predetermined compression ratio and extruding the dried graphite granules therethrough to obtain flexible graphite granules having a further increased bulk density.

3. A molded graphite product according to claim 1 or 2, which is in the form of a packing ring and has a density of 0.8 to 1.1 g/cc.

4. A molded graphite product according to claim 1 or 2, which is in the form of a pipe.

5. A molded graphite product according to claim 1 or 2, which is in the form of a round rod or angular rod.

6. A molded graphite product according to claim 1 or 2, which is in the form of an article having a relatively large length and having a semi-circular or U-shaped cross-section.

* * * * *